United States Patent
Davies et al.

(10) Patent No.: US 6,860,914 B2
(45) Date of Patent: Mar. 1, 2005

(54) ABRASIVE PRODUCT

(76) Inventors: Geoffrey John Davies, 36 Boundary Road, Linden Extension, Randburg (ZA), 2194; Raymond Albert Chapman, 183 Columbine Avenue, Mondeor (ZA), 2091

( * ) Notice: Subject to any disclaimer, the term of this patent is extended or adjusted under 35 U.S.C. 154(b) by 0 days.

(21) Appl. No.: 10/333,915

(22) PCT Filed: Jul. 31, 2001

(86) PCT No.: PCT/IB01/01364

§ 371 (c)(1),
(2), (4) Date: Aug. 27, 2003

(87) PCT Pub. No.: WO02/09909

PCT Pub. Date: Feb. 7, 2002

(65) Prior Publication Data

US 2004/0025443 A1 Feb. 12, 2004

(30) Foreign Application Priority Data

Aug. 2, 2000 (ZA) .......................................... 2000/3919
Aug. 2, 2000 (ZA) .......................................... 2000/3920

(51) Int. Cl.⁷ ................................................ B24D 3/00
(52) U.S. Cl. ............................. 51/307; 51/308; 51/309; 51/293
(58) Field of Search ......................... 51/307, 308, 309, 51/293

(56) References Cited

U.S. PATENT DOCUMENTS

| | | |
|---|---|---|
| 3,399,254 A | 8/1968 | Dunnington |
| 3,574,580 A | 4/1971 | Stephens et al. |
| 3,829,544 A | 8/1974 | Hall |
| 4,224,380 A * | 9/1980 | Bovenkerk et al. .......... 428/545 |
| 4,828,582 A * | 5/1989 | Frushour ..................... 51/293 |

OTHER PUBLICATIONS

S.T. Davey et al.: "An Investigation of plastic deformation in sintered diamond compacts using photoluminescence spectrosopy" Journal of Materials Science Letters, vol. 3, pp. 1090–1092, no month.

C.A.M. Casanova et al., "Experimental study of plastic deformation during sintering of cubic boron nitride compacts" Diamond and Related Materials, vol. 8, No. 8–9, pp. 1451–1454 08/99.

T. Evans et al.: "Photoluminescence studies of sintered diamond compacts" Journal of Materials Science, vol. 19, pp. 2405–2414 1984, no month.

* cited by examiner

Primary Examiner—Michael A Marcheschi
(74) Attorney, Agent, or Firm—Oblon, Spivak, McClelland, Maier & Neustadt, P.C.

(57) ABSTRACT

An abrasive product which comprises a polycrystalline mass of self-bonded abrasive particles of irregular shape, the product being substantially free of a second phase and containing substantial plastic deformation of the abrasive particles. The abrasive particles are preferably diamond or cubic boron nitride and the plastic deformation of the particles is preferably at least 0.3 percent. The abrasive product may be made by subjecting a mass of the particles to elevated temperature and pressure conditions.

13 Claims, 1 Drawing Sheet

ABRASIVE PRODUCT

BACKGROUND OF THE INVENTION

This invention relates to an abrasive product comprising polycrystalline self-bonded abrasive particles, and to a method of making such a product.

The production of leached self-bonded polycrystalline particles is taught in U.S. Pat. No. 4,776,861 in the name of General Electric Company. The method of this reference involves making a polycrystalline compact according to the teaching of, for example U.S. Pat. Nos. 3,141,746, 3,745,623, 3,767,371, 4,104,344, 3,609,818 and 4,224,380, size reducing the compact, e.g. by crushing, and leaching the non-particle matter such as solvent/catalyst from the bonded particles.

The leaching of the non-particle matter from the bonded particles becomes increasingly difficult as the grain size of the crystals making up the particles decreases, as the porosity of the self-bonded particles decreases, and as the size of the self-bonded particles increases.

The self-bonded particles produced according to the method of U.S. Pat. No. 4,776,861 are characterised by a large extent of diamond-to-diamond bonding, which results in a low friability (high strength), and a low porosity, usually less than about 10%.

Polycrystalline self-bonded diamond particles may also be produced using a shock wave method as taught in U.S. Pat. No. 3,238,019. The method involves non-diamond carbon being mixed with an inert material, and subjecting the mixture to an explosive shock wave in which very high pressures and high temperatures are realised for a short time period. The inert material is included in the mixture to facilitate heat removal from the system. The mixture is recovered from the explosion and crushed, before chemical treatment to remove remaining non-diamond carbon and the inert material. The cleaned diamond is then crushed further and graded as necessary.

Polycrystalline particles produced according to the method of U.S. Pat. No. 3,238,019 are characterised by a high friability (low strength) and very limited self-bonding.

U.S. Pat. No. 4,181,505 discloses a method of producing free discrete work-hardened diamond crystals. A large diamond is embedded in a mass of relatively large diamond crystals and this assembly subjected to temperature and pressure conditions at which diamond is thermodynamically stable. The large diamond crystal is work-hardened in this manner and is said to have shown evidence of plastic deformation.

SUMMARY OF THE INVENTION

According to a first aspect of the invention, there is provided an abrasive product comprising a polycrystalline mass of self-bonded abrasive particles of irregular shape, the product being substantially free of second phase and containing substantial deformation of the abrasive particles.

The abrasive product is a polycrystalline mass of self-bonded abrasive particles and is substantially free of a second phase or additional component.

In other words, there is no bonding metal or sintering aid such as a solvent/catalyst, or other such material. Any additional component which may be present is there in trace amounts only.

Further, the diamond particles are of irregular shape. They may, for example, be particles which have been produced by crushing or milling action. Thus, in the self-bonded product, there is evidence of asperities, sharp points or edges of one crystal bearing upon a substantially flat area of an adjacent crystal, resulting in plastic deformation at the contact points between crystals. The plastic deformation of the particles is preferably at least 0.3 percent, and more preferably at least 0.5 percent.

The method of measuring plastic deformation, as used in the specification is as follows:

Step 1

The shapes (profiles) of the X-ray diffraction peaks, viz, (100), (220), (311) and (331), for the diamond before treatment are recorded.

Step 2

The shapes of the same X-ray diffraction peaks are recorded after treatment, using a sample that has been crushed to less than about 120 microns, and using the same X-ray diffraction conditions.

Step 3

The widths of corresponding before and after peaks are compared, and the widths of the peaks at half their maximum intensities are measured using a curve fitting software routine. Simultaneously, the peaks are deconvoluted into their $K\alpha_1$ and $K\alpha_2$ components.

Each peak is in fact a combination of two peaks due to $K\alpha_1$ and $K\alpha_2$ radiations. Both peaks have the same shape and are related to one another in terms of intensity ($K\alpha_1$ being about twice the intensity of $K\alpha_2$) and relative peak maximum positions (the difference in positions increases with increasing Bragg angle in a predetermined way).

Step 4

The broadening for each pair of before and after treatment peaks is calculated. This calculation may be done in several ways. The way used in this specification is:

$$\beta^2 = B^2 - b^2$$

where $\beta$ in the peak broadening due to plastic deformation and/or crystallite size, B is the measured peak breadth after treatment and b is the measured peak breadth before treatment. For large differences, the method of calculation of $\beta$ has little effect on the result.

Step 5

The value of $\beta \cdot \cos\theta$ for each peak is calculated and plotted against the value $\sin\theta$.

Step 6

The slope of the least squares line of best fit is calculated. This slope is indicative of the plastic deformation.

The definitive part of the method used is the equation, $\beta \cdot \cos\theta = K\lambda/L + \eta \cdot \sin\theta$. To a person skilled in the art of X-ray diffraction, this conveys the theoretical and analytical principles employed in the method of determining the plastic deformation, $\eta$.

The abrasive product will also generally have a porosity of at least 5 percent by volume, and preferably a porosity which is greater than 10 percent by volume and does not exceed 25 percent by volume.

The abrasive particles may be diamond, cubic boron nitride (cBN), tungsten carbide, silicon carbide, quartz or corundum. The preferred abrasive particles are ultra-hard abrasive particles such as diamond or cubic boron nitride. In the case of diamond, the diamond may be synthetic diamond made by a high pressure-high temperature (HPHT) process, synthetic diamond made by a chemical vapour deposition (CVD) method, shock wave diamond or natural diamond.

According to a further aspect of the invention, there is provided a method of making an abrasive product as described above which includes the steps of:

(a) providing a mass of abrasive particles,
(b) subjecting the mass of particles to conditions of elevated temperature and pressure to self-bond the particles together in the absence of a second phase. Thus, the mass of particles is substantially free of any additional component or second phase at the time it is subjected to the elevated temperature and pressure conditions.

The conditions of elevated temperature and pressure which are applied will depend upon the nature of the abrasive particles used. In the case of ultra-hard abrasive particles, these conditions of elevated temperature and pressure are preferably such that the ultra-hard abrasive particle is thermodynamically stable.

In the case of diamond, the conditions of temperature and pressure will generally be in the region of diamond thermodynamic stability in the graphite-diamond phase diagram. Conditions outside the region of diamond thermodynamic stability may also be used provided that the time during which the conditions are applied is insufficient for significant reversion of the diamond to graphite to take place. Typically, the conditions used are temperatures in the range 750 to 1400° C. and pressure in the range 3 to 6 GPa.

In the case of cubic boron nitride, the conditions of temperature and pressure will generally be in the region of cubic boron nitride stability in the boron-nitrogen phase diagram. Conditions outside the region of cubic boron nitride stability may also be used provided that the time for which the conditions are applied is insufficient for significant reversion of the cubic boron nitride to hexagonal boron nitride to take place. Typically, the conditions used are temperatures in the range 750 to 1400° C. and pressures in the range 3 to 6 GPa.

In one preferred form of the invention, the abrasive particles are ultra-hard abrasive particles such as diamond or cBN and in step (b), the pressure is first raised to above 1 GPa, the temperature then raised to bring the particles into a temperature and pressure region to produce plastic deformation of the particles and the pressure thereafter raised to bring the particles into a region in which the particles are thermodynamically stable.

The particles are of irregular shape and thus have asperities, points and edges as well as some flat areas. It is believed that self-bonding of the particles occurs due to the very high contact pressure generated when an asperity, point or edge on one particle bears upon a substantially flat area of an adjacent particle. The very high contact pressure is well in excess of the nominal applied pressure of the pressurising system. Such high contact pressure when applied at an elevated temperature causes plastic deformation at the contact points between particles thereby promoting the movement of the constituent atoms of the crystal and facilitating self-bonding. Generally, the extent of self-bonding is determined by the selected conditions of temperature and pressure and the period for which the conditions are applied. The extent of self-bonding of the particles determines the strength or friability of the polycrystalline bonded product.

The abrasive product which is produced by the method described above is relatively large and will generally have a largest dimension of at least 1 mm. The product may have a variety of shapes such as cylindrical and may be used as such for abrasive operations such as in bruting tools or as blanks for wire drawing dies. By way of example, cylinders having a diameter of up to 75 mm and thicknesses of up to 20 mm may be produced. The thus produced abrasive product may be size reduced, for example by cutting to smaller pieces millimetres in size. The size reduction may also be achieved by crushing or milling to produce smaller polycrystalline self-bonded products or particles generally having a particle size of less than 500 microns and more preferably less than 100 microns. The crushed product may be used in polishing or lapping, either dry or as a slurry.

DESCRIPTION OF EMBODIMENTS

The abrasive product of the invention is characterised by being a polycrystalline mass of self-bonded abrasive particles of irregular shape and by the product being substantially free of second phase and containing substantial plastic deformation of the abrasive particles. Further, it has been found that the product, particularly when the particles are ultra-hard abrasive particles, has a friability between that of shockwave diamond particles such as that produced by the method of U.S. Pat. No. 3,238,019 and leached polycrystalline diamond particles as produced, for example, by the method described in U.S. Pat. No. 4,776,861.

In carrying out the method of the invention, with ultra-hard abrasive particles, it is preferred that the particles are below a defined maximum. By this is meant that generally at least 80 percent, and preferably at least 90 percent, do not exceed the defined maximum particle size.

In the case of diamond particles, the defined maximum particle size is typically 60 microns, preferably 50 microns, with a lower limit of particle size of about 0.1 microns. In the case of cubic boron nitride particles, the defined maximum particle size is typically 500 microns, preferably 200 microns, with a lower limit of particle size of about 0.1 microns. This lower limit is imposed by the limitations of crushing and grading methods and not by the method of the invention.

Figure 1:
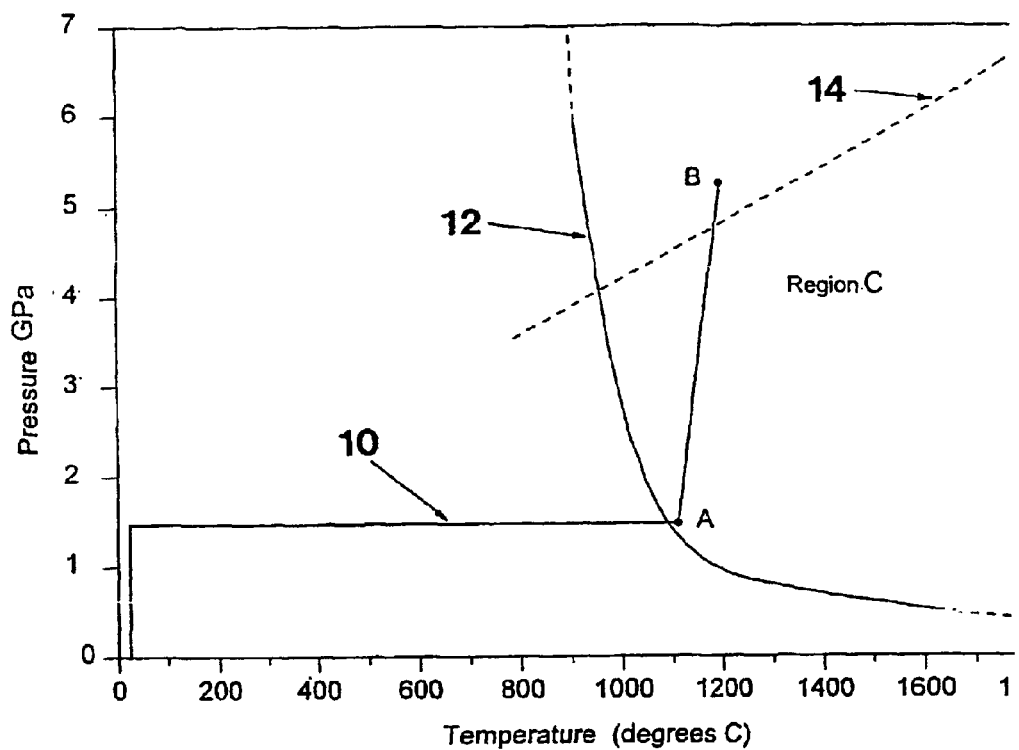
FIG. 1 is a pressure/temperature graph illustrating an example of a temperature-pressure profile for use in the method of the invention.

When the particles are ultra-hard abrasive particles the temperature-pressure conditions which are applied are preferably those illustrated in the attached FIG. 1. Referring to FIG. 1, the temperature and pressure conditions applied or profile is illustrated by line 10. It will be noted that the pressure is first raised to a value above 1 GPa, and the temperature thereafter raised to a point A at which the particles are placed in a region C which is a region of plastic deformation of the particle. The region C is bounded by line 12. Line 12 of FIG. 1 exemplifies but does not define the boundary between the region of plastic deformation and the region of no plastic deformation. It is a transition region and not a sharp cut-off. Furthermore, the displacement of the line 12 to higher or lower temperatures depends upon the nature of the impurities in the abrasive particle (e.g. boron or nitrogen) and the level of those impurities. Thereafter, the pressure is again raised, for example, to a point B which is above line 14, the thermodynamic equilibrium line for the particular ultra-hard abrasive particle used. Pressures below the equilibrium line 14 can be used provided that the time for which the conditions are maintained is insufficient for significant transformation of the ultra-hard abrasive to take place.

The particles will generally be placed in a container which itself is placed in the reaction zone of a known high pressure/high temperature apparatus for application of the required conditions of temperature and pressure. The bonded product may be recovered from the container in any known manner, for example by mechanical removal or chemical digestion of the container.

The properties of the abrasive product of the invention may be modified by infiltrating the particles with a desired infiltrant such as a metal, alloy, plastic, ceramic or glass, or precursors of any of these infiltrants.

Optionally, the abrasive product of the invention may be clad with a suitable coating, such as titanium or copper.

The invention is illustrated by the following examples.

EXAMPLE 1

A quantity of diamond powder was made by crushing and grading high pressure-high temperature (HPHT) synthetic diamond crystals to a particle size range of 3 to 5 microns. The powder was washed with acid to remove contamination, rinsed with de-ionised water and dried. The diamond was of an irregular shape. A 50 g quantity of the cleaned diamond was placed in a titanium metal canister, and the canister was placed in a high pressure, high temperature apparatus. The canister was raised to conditions of about 5 GPa and about 1200° C., using a temperature-pressure profile similar to that shown in FIG. 1, and these conditions were maintained for 30 minutes. After this treatment, the canister was recovered from the reaction volume, and the treated diamond liberated by mechanically removing the embrittled titanium with a scalpel. The diamond had formed a coherent compact with a porosity of about 22%, estimated from the mass and dimensions of the compact.

Figure 2:
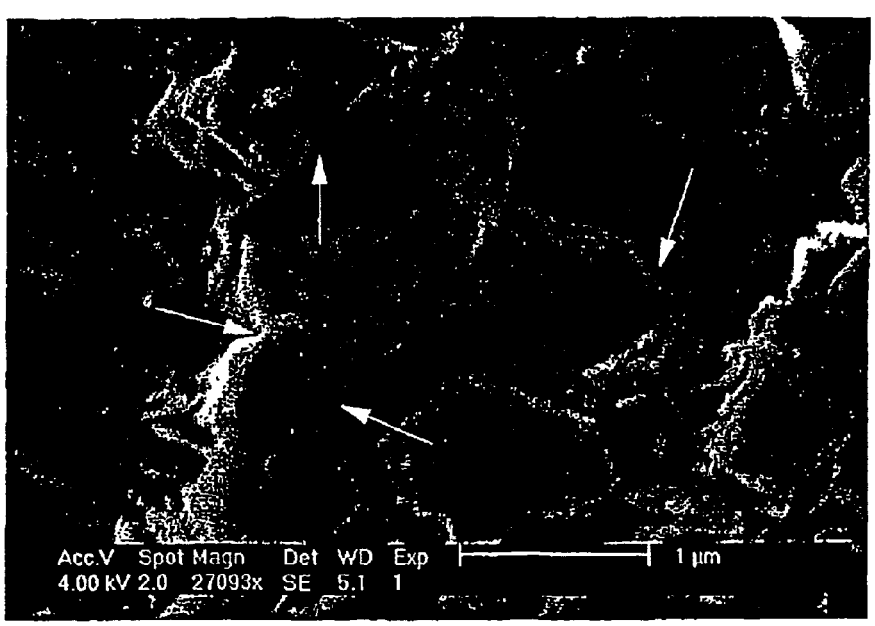
FIG. 2 is a photomicrograph of a polished surface of a polycrystalline self-bonded abrasive product of the invention.

The compact was crushed using a pestle and mortar and the resulting particles screened to a particle size range of 88 μm to 44 μm. A number of particles were mounted in resin and polished. The polished sections of polycrystalline self-bonded diamond particles were substantially as shown in FIG. 2, with distinct areas displaying "necking" and self-bonding pointed out by the arrows. A sample of the potycrystalline self-bonded particles was crushed further to pass through a 44 μm screen, and examined using an X-ray diffractometer. From the broadening of the (100), (220), (311) and (331) reflexions, the plastic deformation of the diamond crystals was measured to be about 1.1%.

EXAMPLE 2

A polycrystalline self-bonded diamond particle product was made according to the procedure described in Example 1 using diamond crystals of irregular shape with a nominal size range of 0.5 to 1 micron, and using the same temperature-pressure conditions. The self-bonded mass formed a coherent compact with a porosity of about 9%. The compact was crushed and examined in the same manner as Example 1. Only carbon was found by X-ray mapping of the polished section. The plastic deformation was measured to be 0.9%.

EXAMPLES 3 to 8

In these examples, the temperature-pressure conditions and examination methods as used in Example 1 were applied to diamond crystals of different size ranges and different origins. Example 7 used a similar temperature-pressure profile except the final temperature was about 1400° C. Example 8 used a similar temperature-pressure profile except the final pressure was about 3.0 GPa. All self-bonded diamond particle masses formed coherent compacts after step (b), and all showed self-bonding of the diamond crystals, with a general appearance as in FIG. 2

| Example | Diamond type | Diamond size | Plastic deformation (%) | Porosity (%) |
|---------|--------------|--------------|-------------------------|--------------|
| 3 | HPHT synthetic | less than 0.5 micron | 0.7 | 5 |
| 4 | HPHT synthetic | 30 to 40 microns | 0.7 | 20 |
| 5 | Natural | 8 to 16 microns | 0.9 | 10 |
| 6 | CVD | 49 to 57 microns | 0.65 | 14 |
| 7 | HPHT synthetic | 3 to 5 microns | 1.1 | n.d. |
| 8 | HPHT synthetic | 3 to 5 microns | 0.9 | n.d. | n.d. means not determined

EXAMPLE 9

A quantity of cubic boron nitride crystals with a nominal size of 3 microns was subjected to the temperature-pressure conditions of Example 1 except that the final temperature was about 1100° C. and then examined as set out in Example 1. The self-bonded mass after step (b) was coherent. The plastic deformation was measured to be 1.15%.

EXAMPLE 10

The quantitative measurement of friability of weak polycrystalline particles is unreliable. A simple comparative evaluation of the friabilities of a selection of polycrystalline self-bonded particles, a sample of shock wave particles and a sample of leached polycrystalline diamond produced according to the teachings of U.S. Pat. No. 4,776,861 was undertaken. A small quantity of each sample, with nominally the same particle size range were placed on a steel plate, and squeezed and crushed with a rotating motion using a spatula. The samples were then ranked with respect to the ease with which the particles were broken. The ranking in order of decreasing friability was as follows:

| Rank | Sample | Comments |
|------|--------|----------|
| 1 | Shock wave Diamond | Smeared over the plate surface very easily, highly friable |
| 2 | Example 9 | Broke under low pressure, did not smear, less friable than shock wave particles |
| 3 | Example 1 | Broke under moderate pressure, less friable than Example 9 |
| 4 | Example 8 | Broke only under the highest pressure, more friable than leached particles |
| 5 | Leached polycrystalline | Did not break under highest pressure, not friable |

What is claimed is:

1. An abrasive product comprising a polycrystalline mass of self-bonded ultra-hard abrasive particles of irregular shape, the product being substantially free of a second phase to the extent that any second phase is present only in trace amounts and the abrasive product has a porosity which is greater than 10 percent by volume and does not exceed 25 percent by volume, wherein the abrasive particles in the abrasive product has undergone substantial plastic deformation of the abrasive particles, such plastic deformation being at least 0.3 percent.

2. An abrasive product according to claim 1 wherein the plastic deformation of the particles is at least 0.5 percent.

3. An abrasive product according to claim 1 wherein the ultra-hard abrasive particles are diamond particles.

4. An abrasive product according to claim 3 wherein the particle size of the diamond particles does not exceed 60 microns.

5. An abrasive product according to claim 3 wherein the particle size of the diamond particles does not exceed 50 microns.

6. An abrasive product according to claim 1 wherein the abrasive particles are cBN particles.

7. An abrasive product according to claim 6 wherein the particle size of the cBN particles does not exceed 500 microns.

8. An abrasive product according to claim 6 wherein the particle size of the cBN particles does not exceed 200 microns.

9. An abrasive product according to claim 1 which has a largest dimension of at least 1 mm.

10. An abrasive product according to claim 1 having a size of less than 500 microns.

11. A method of making an abrasive product according to claim 1 including the steps of.

(a) providing a mass of ultra-hard abrasive particles, (b) subjecting the mass of particles to conditions of elevated temperature and pressure at which the ultra-hard abrasive particles are thermodynamically stable to self-bond the particles together in the absence of a second phase, wherein during said subjecting the pressure is first raised to above 1 GPa, the temperature is then raised to bring the particles into a temperature and pressure region to produce plastic deformation of the particles, and the pressure thereafter raised to bring the particles into a region in which particles are thermodynamically stable.

12. A method according to claim 11 wherein the abrasive product produced is size reduced.

13. A method according to claim 12 wherein the size reduction takes place by crushing or milling.

* * * * *